(12) United States Patent
Lee

(10) Patent No.: US 8,556,491 B2
(45) Date of Patent: Oct. 15, 2013

(54) BACKLIGHT ASSEMBLY HAVING A PLURALITY OF LIGHT GUIDE PLATES

(75) Inventor: Sangduk Lee, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 291 days.

(21) Appl. No.: 12/892,545

(22) Filed: Sep. 28, 2010

(65) Prior Publication Data

US 2011/0176292 A1     Jul. 21, 2011

(30) Foreign Application Priority Data

Jan. 20, 2010 (KR) .................. 10-2010-0005289

(51) Int. Cl.
*F21V 8/00* (2006.01)
*F21V 17/00* (2006.01)
(52) U.S. Cl.
USPC .......................................... 362/616; 362/613
(58) Field of Classification Search
USPC .................... 362/612, 613, 616, 581
See application file for complete search history.

(56) References Cited

U.S. PATENT DOCUMENTS

| | | | | |
|---|---|---|---|---|
| 6,241,358 | B1 * | 6/2001 | Higuchi et al. | 362/613 |
| 6,464,367 | B2 * | 10/2002 | Ito et al. | 362/613 |
| 6,927,812 | B2 * | 8/2005 | Cho | 349/65 |
| 8,189,135 | B2 * | 5/2012 | Bae et al. | 349/61 |
| 8,223,296 | B2 * | 7/2012 | Lee et al. | 349/65 |
| 2006/0221638 | A1 | 10/2006 | Chew et al. | |

FOREIGN PATENT DOCUMENTS

| | | |
|---|---|---|
| WO | 2009/145548 | 12/2009 |
| WO | 2009/157351 | 12/2009 |

OTHER PUBLICATIONS

Extended European Search Report of EP 10014000.3 issued on Feb. 7, 2011, corresponding to US. Appl. No. 12/892,545.

\* cited by examiner

*Primary Examiner* — Alan Cariaso

(74) *Attorney, Agent, or Firm* — H.C. Park & Associates, PLC

(57) ABSTRACT

In a backlight assembly including a plurality of light guide plates, each light guide plate includes a light incident portion having a light incident surface facing a light source and a light facing portion having a light facing surface opposite to the light incident surface. The light facing portion of each light guide plate is overlapped with the light incident portion of an adjacent light guide plate in a plan view and fixed to the light incident portion of the adjacent light guide plate.

20 Claims, 13 Drawing Sheets

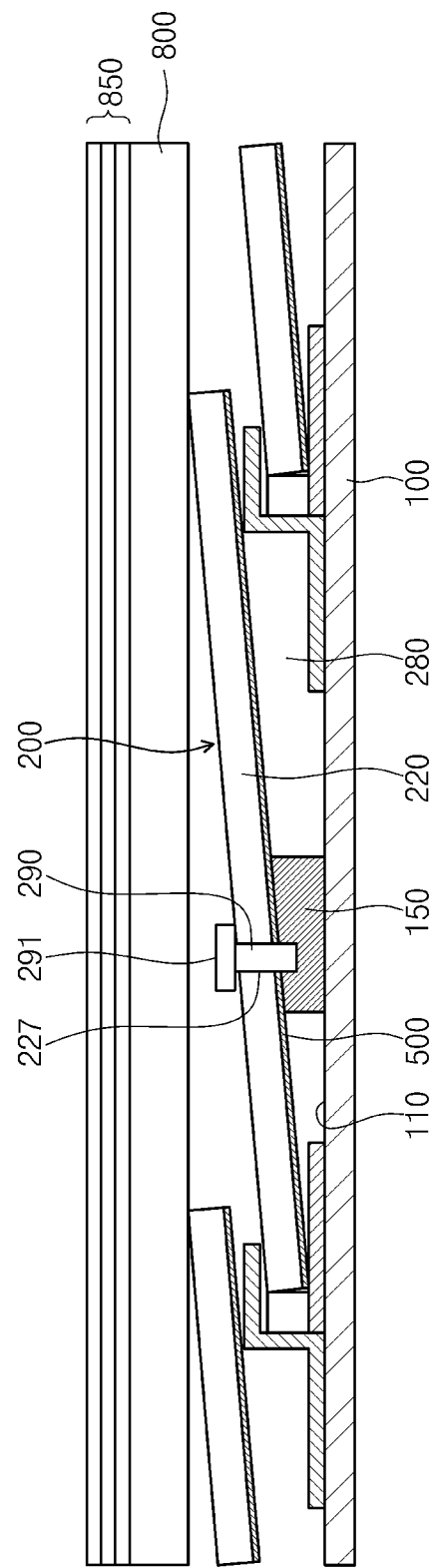

BACKLIGHT ASSEMBLY HAVING A PLURALITY OF LIGHT GUIDE PLATES

CROSS-REFERENCE TO RELATED APPLICATION

This application claims priority from and the benefit of Korean Patent Application No. 2010-5289, filed on Jan. 20, 2010, which is hereby incorporated by reference for all purposes as if fully set forth herein.

BACKGROUND OF THE INVENTION

1. Field of the Invention

Exemplary embodiments of the present invention relate to a backlight assembly having a plurality of light guide plates. More particularly, exemplary embodiments of the present invention relate to a backlight assembly capable of preventing movement of the light guide plate to improve display quality of the display apparatus.

2. Discussion of the Background

In general, a liquid crystal display includes a liquid crystal panel that displays an image and a backlight assembly that provides light to the liquid crystal panel. The liquid crystal panel includes two transparent substrates and a liquid crystal layer disposed between the two substrates to display the image in response to a variation in the arrangement of liquid crystal molecules of the liquid crystal layer caused by an electric signal.

The backlight assembly is classified as a direct-illumination type backlight assembly or an edge-illumination type backlight assembly according to the position of the light source. The direct-illumination type backlight assembly has a plurality of light sources located in a region overlapping the liquid crystal panel. However, since a distance between the liquid crystal panel and the light sources is required to uniformly provide light to the liquid crystal panel, the liquid crystal display increases in thickness.

In the edge-illumination type backlight assembly, the light sources are disposed outside the liquid crystal panel while not overlapping the liquid crystal panel in a plan view, and a light guide plate having a constant thickness is used to uniformly provide the liquid crystal panel with light from an exterior. Since light emitted from the light sources is provided to the liquid crystal panel after passing through the light guide plate, brightness in the liquid crystal panel is decreased. In addition, the liquid crystal display is heavier due to the light guide plate.

Recently, a hybrid-type backlight assembly has been suggested to improve deficiencies of the direct-illumination type backlight assembly and the edge-illumination type backlight assembly. The hybrid-type backlight assembly includes a plurality of light emitting units each of which includes a light source that emits light and a light guide plate that receives light from the light source. The light emitting units are disposed under the liquid crystal panel such that each of the light emitting units partially overlaps an adjacent light emitting unit. Thus, a distance between the liquid crystal panel and the light emitting units is reduced, thereby increasing brightness of the liquid crystal display. However, when the light emitting units are disposed in one backlight assembly, the light source and the light guide plate may shift from their original positions. Due to the movement of the light source and the light guide plate, damage to the liquid crystal display may occur.

SUMMARY

Exemplary embodiments of the present invention provide a backlight assembly capable of securely holding a light emitting unit to improve its reliability.

Additional features of the invention will be set forth in the description which follows, and in part will be apparent from the description, or may be learned by practice of the invention.

An exemplary embodiment of the present invention discloses a backlight assembly comprising a plurality of light emitting units arranged adjacent to each other to provide a light to a display panel, and a lower container that accommodates the light emitting units, wherein at least one light emitting unit comprises a light source module to emit the light, a light guide plate to guide the light emitted from the light source module to the display panel, and a light source cover covering the light source module, and wherein the light source cover of the at least one light emitting unit comprises a fixing member to fix a light guide plate of an adjacent light emitting unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a sectional view showing a structure of the backlight assembly wherein a light guiding portion of the light guide plate is supported and fixed by a light guide plate supporting portion formed on a lower container and an engaging member.

DETAILED DESCRIPTION OF THE ILLUSTRATED EMBODIMENTS

Figure 1:
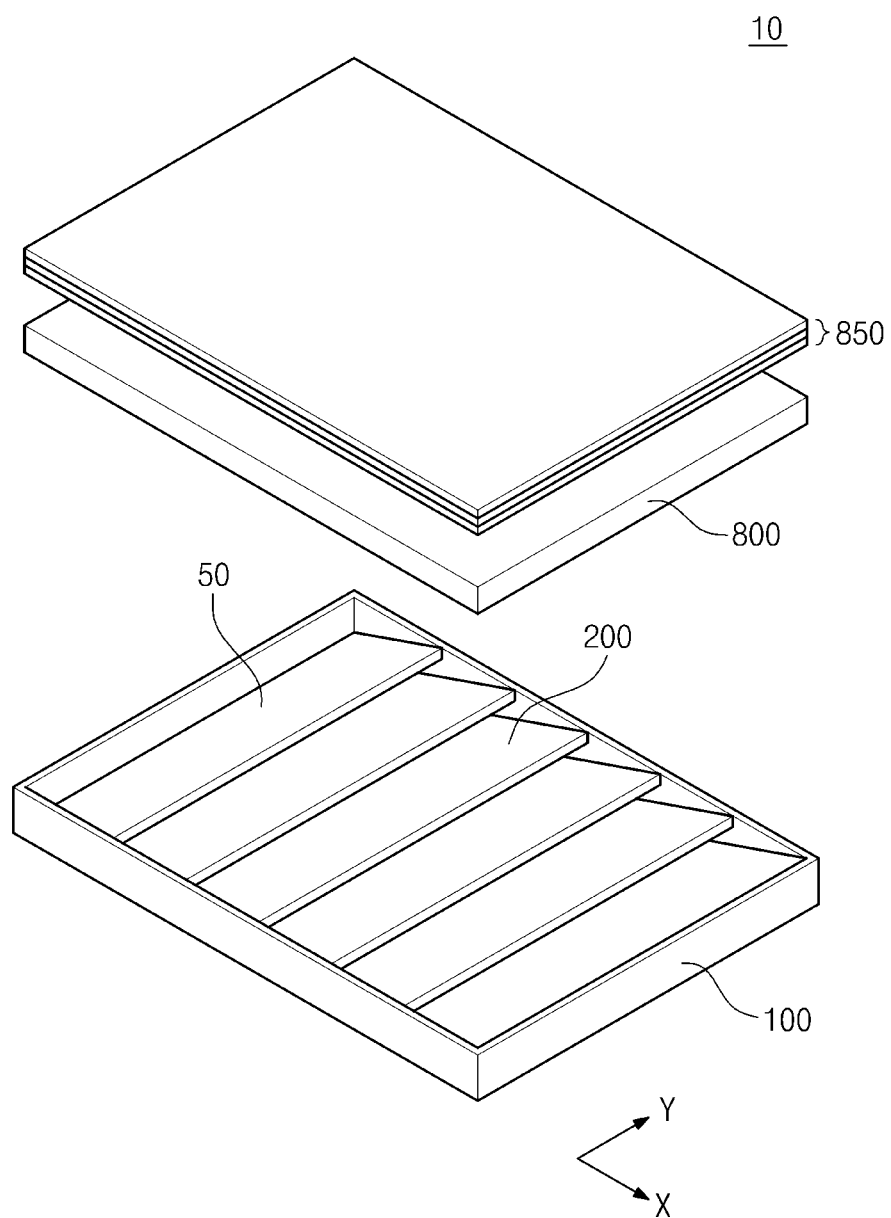
FIG. 1 is an exploded perspective view showing a backlight assembly including a plurality of light emitting units according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a backlight assembly including a plurality of light emitting units according to exemplary embodiments of the present invention.

Referring to FIG. 1, a backlight assembly 10 includes a plurality of light emitting units 50. Each light emitting unit 50 has the structure of an edge-illumination type backlight assembly. In particular, each light emitting unit 50 includes a light guide plate 200 and a light source module (not shown) arranged adjacent to the light guide plate 200 and emits a light in response to the supply of power voltage from an exterior. In FIG. 1, the light emitting units 50 have the same structure, but the structure of the backlight assembly 10 should not be limited thereto or thereby. That is, although not shown in FIG. 1, the structure of the light emitting units 50 may be selectively applied to one or some of the light emitting units 50, and the other light emitting units 50 may have a different structure.

In the present exemplary embodiment, the light emitting units 50 are connected with each other in series in an x-direction. In particular, a light source module of each of the light emitting units 50 overlaps the light guide plate 200 of an adjacent light emitting unit 50 in a plan view. Although not shown in FIG. 1, the light emitting units 50 are connected with each other in series in one direction and connected with each other in parallel in another direction. In other words, according to FIG. 1, the light emitting units 50 may be connected with each other in series in the x-direction and connected with each other in parallel in a y-direction substantially perpendicular to the x-direction, so that the light emitting units 50 may be arranged in a two-dimensional array. Since the light emitting units arranged in the two-dimensional array may be driven independently to emit the light, a backlight local dimming method in which the brightness of the liquid crystal display is partially controlled after analyzing images displayed on the liquid crystal display may be easily applied to the liquid crystal display.

In addition, the light emitting units 50 are arranged at positions overlapping the liquid crystal panel (not shown), so that the backlight assembly 10 may serve as a direct-illumination type backlight assembly. As described above, the backlight assembly 10 according to the present exemplary embodiment has structural characteristics of the edge-illumination type backlight assembly and the direct-illumination type backlight assembly to form a hybrid-type backlight assembly. The hybrid-type backlight assembly may be called a tiled-type backlight assembly.

According to FIG. 1, a diffusion plate 800 and an optical sheet 850 are disposed on the light emitting units 50. The diffusion plate 800 diffuses the light emitted from the light emitting units 50 to improve uniformity of the light. The optical sheet 850 may include various optical sheets, such as a diffusion sheet, a light collection sheet, etc., and have various combinations of those sheets to provide light distribution characteristics required for the liquid crystal display.

The light emitting units 50, the diffusion plate 800, and the optical sheet 850 are accommodated in a lower container 100. The lower container 100 determines an external shape of the backlight assembly 10 and the liquid crystal display, blocks external impact to the backlight assembly 10 and the liquid crystal display, and transmits heat generated therefrom to the exterior of the lower container 100. The lower container 100 is coupled with an upper container (not shown) to accommodate the liquid crystal display. In FIG. 1, the lower container 100 has a rectangular shape in which an accommodating space is defined, but the shape of the lower container 100 should not be limited thereto or thereby. That is, the lower container 100 may have various shapes if the light emitting units 50 may be stably accommodated and the heat generated inside the lower container 100 may be effectively dissipated.

Figure 2:
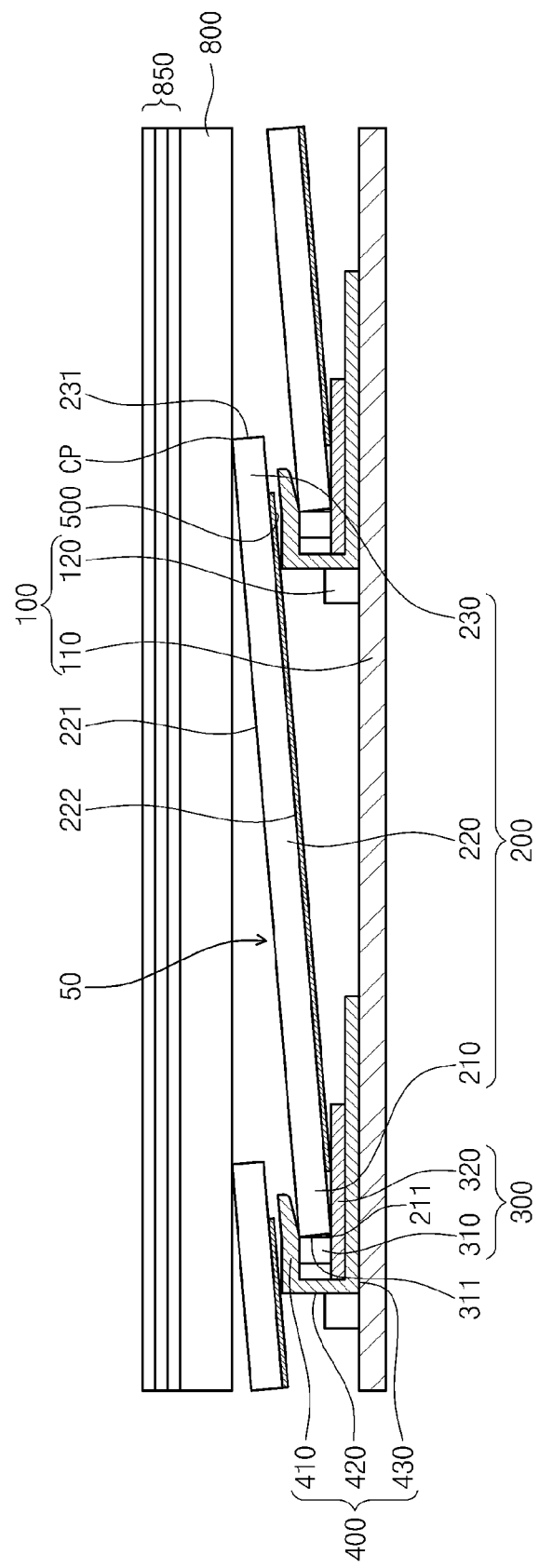
FIG. 2 is a sectional view showing an assembled structure of the backlight assembly including the light emitting units of FIG. 1.

FIG. 2 is a sectional view showing an assembled structure of the backlight assembly including the light emitting units of FIG. 1. In the present exemplary embodiment, since the light emitting units 50 have the same structure and function, for the convenience of explanation, one or two light emitting units 50 will be described in detail as a representative example.

Referring to FIG. 2, each light emitting unit 50 includes a light source module 300, a light source cover 400, and the light guide plate 200. In the above-described hybrid-type backlight assembly, the light source module 300 of each light emitting unit 50 overlaps the light guide plate 200 of adjacent light emitting unit 50. The light source module 300 includes a light emitting device 310 that converts an electric signal to emit the light and a printed circuit board 320 that provides the electric signal to the light emitting device 310. The light source module 300 may utilize various light sources such as a cold cathode fluorescent lamp, a heat cathode fluorescent lamp, an organic light emitting device, an inorganic light emitting device, a light emitting diode, etc. In the present exemplary embodiment, the light emitting diode will be described as an example of the light source module 300, but it should not be limited thereto or thereby.

In detail, the light source module 300 may include the light emitting device 310, which has a light emitting diode package including a semiconductor light emitting device, an insulating package, and an electrode. The light emitting device 310 may have a different structure to emit light using the semiconductor light emitting device. The light source module 300 further includes the printed circuit board 320 to apply the electric signal to the light emitting device 310. A plurality of light emitting devices 310 may be mounted on the printed circuit board 320, and the plurality of light emitting devices 310 may collectively emit the light. The printed circuit board 320 drives the light emitting device 310 using a conductive pattern (not shown) and includes a base substrate on which the conductive pattern is formed.

The light emitting device 310 provides the light to the light guide plate 200 through a light emitting surface 311 of the light emitting device 310. The light emitting surface 311 contacts a light incident surface 211 of the light guide plate 200 to improve the light incident efficiency. The light guide plate 200 includes a light incident portion 210 provided with the light incident surface 211, a light guiding portion 220 extended from the light incident portion 210, and a light facing portion 230 extended from the light guiding portion 220. The light facing portion 230 is provided with a light facing surface 231 which faces the light incident surface 211 of the light incident portion 210. The light incident portion 210 is covered by the light source cover 400, and the light incident portion 210 may also be covered by the light facing portion 230 of the light guide plate 200 of adjacent light emitting unit 50.

The light incident portion 210 is connected with the light guiding portion 220, so that the light that enters through the light incident surface 211 may be transmitted to the light guiding portion 220. The light guiding portion 220 may be provided with a predetermined pattern formed thereon or therein to uniformly distribute the light in the light guide plate 200. In addition, the light guiding portion 220 includes a light exiting surface 221 from which the light exits toward the liquid crystal panel (not shown) and a reflecting surface 222 by which the light is reflected. In addition, a reflecting sheet 500 may be disposed under the reflecting surface 222. The reflecting sheet 500 is attached to the reflecting surface 222 to allow the light to be uniformly distributed in the light guiding portion 220.

According to FIG. 2, the light guiding portion 220 is upwardly inclined toward the diffusion plate 800 from the light incident portion 210 adjacent to the light source module 300. The light guiding portion 220 is connected with the light facing portion 230. The light facing portion 230 includes the light facing surface 231 and overlaps the light source module 300 and the light source cover 400 of adjacent light emitting unit 50. Particularly, the light facing portion 230 is supported by the light source cover 400 of adjacent light emitting unit 50.

The light incident surface 211 is positioned at a relatively lower position in the backlight assembly, the light facing surface 231 is positioned at a relatively higher position in the backlight assembly, and the light guiding portion 220 is positioned between the light incident surface 211 and the light facing surface 231. The light facing surface 231 is positioned near the diffusion plate 800 and contacts the diffusion plate 800 at a contact point CP. In this case, the contact point CP may be a point or a regular or irregular line segment. As described above, since each light source module 300 is covered by the light guide plate 200, a distance between the diffusion plate 800 and the light guide plate 200, which is required to obtain light over the light source module 300, may be reduced or eliminated. Thus, the light guide plate 200 may contact or be adjacent to the diffusion plate 800, thereby reducing the thickness of the backlight assembly 10.

Meanwhile, the thickness of the light facing surface 231 may be the same as the light incident surface 211 as shown in FIG. 2, so that the light guide plate 200 may have a substantially uniform thickness. However, the light guide plate 200 may have a wedge shape in which a thickness of the light guide plate 200 decreases from the light incident surface 211 to the light facing surface 231. In order to reduce the thickness of the backlight assembly 10, the light guide plate 200 should be thin. For example, the light guide plate 200 having a thickness of a few millimeters, generally, may be formed through an extrusion molding process. Since the light guide plate 200 formed through the extrusion molding process may be provided with a substantially uniform thickness and may have flexibility, the light guiding portion 220 may be flat by shapes of the reflecting sheet 500 and the lower container 100. In addition, the light guide plate 200 may be formed through an injection molding process, which forms a light guide plate 200 having a thickness greater than the light guide plate 200 formed through the extrusion molding process. The injection molding process has an advantage in forming the wedge-type light guide plate. The light guide plate 200 may be formed of a transparent polymer such as polymethylmethacrylate (PMMA).

According to FIG. 2, the light source cover 400 is shaped to surround the light source module 300. The light source cover 400 includes an upper cover 410 disposed above the light source module 300, a lower cover 430 disposed below the light source module 300, and a center cover 420 connecting the upper cover 410 and the lower cover 430 and facing the light incident surface 211 of the light guide plate 200. Specifically, the upper cover 410 supports the light facing portion 230 of adjacent light guide plate 200.

The upper cover 410 is mechanically coupled with the light facing portion 230 of the light guide plate 200 of the adjacent light emitting unit 50. In other words, the light facing portion 230 of the light guide plate 200 of the adjacent light emitting unit 50 may be simply placed on or adhered to the upper cover 410. The lower cover 430 extends from the center cover 420 to the lower portion of a corresponding light emitting unit 50 to support the light incident portion 210 and is fixed to the lower container 100 using a separate device (not shown). In addition, the lower cover 430 may support the printed circuit board 320 of the light source module 300. In FIG. 2, the light source cover 400 has a substantially U-shape in cross section, but it should not be limited thereto or thereby.

The lower container 100 according to FIG. 2 accommodates the light emitting units 50 on a main surface 110 thereof. In particular, the lower cover 430 of each light emitting unit 50 may be directly coupled with the main surface 110 and the center cover 420 of each light emitting unit 50 may be held by a stopper 120.

Figure 3A:
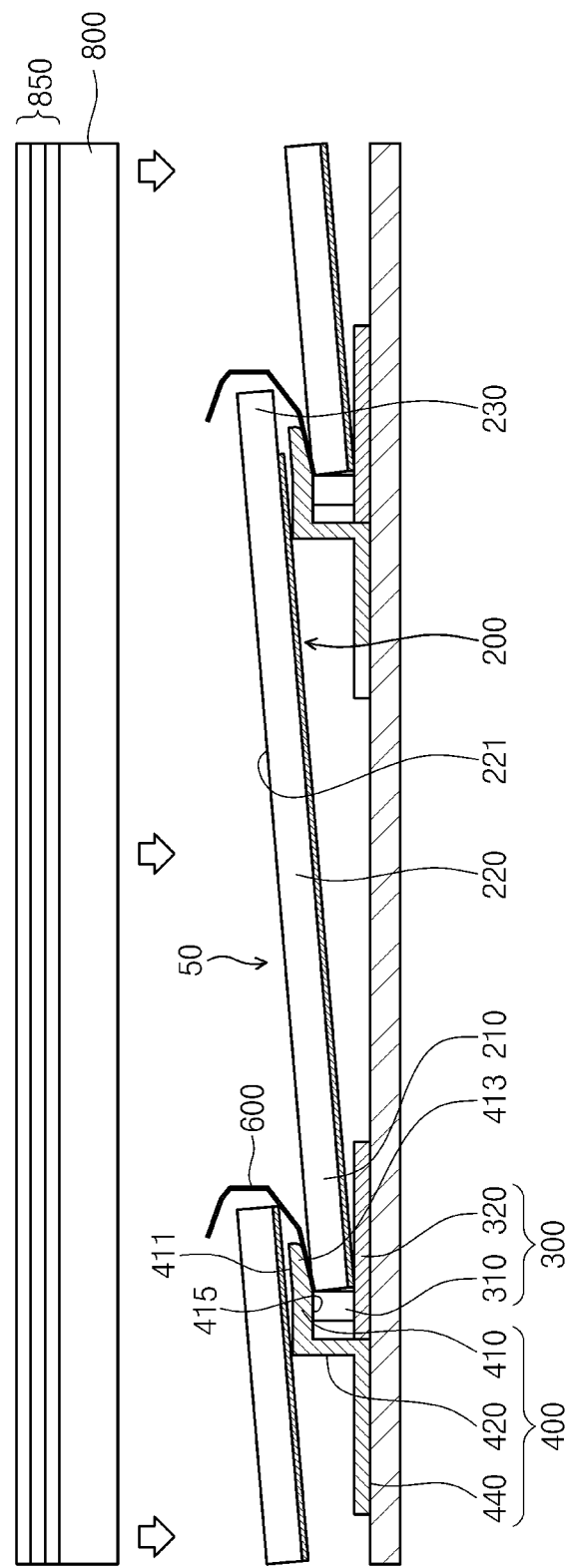
FIG. 3A is a sectional view showing a structure of the backlight assembly wherein a light facing portion of each of the light emitting units is covered by a fixing member.

FIG. 3A is a sectional view showing a structure of the backlight assembly that a light facing portion of each of the light emitting units is covered by a fixing member. In FIG. 3A, the same reference numerals denote the same elements in FIG. 2, and thus detailed descriptions of the same elements will be omitted.

According to the present exemplary embodiment, a lower container 100 of a backlight assembly 10 accommodates a plurality of light emitting units 50 therein. Each light emitting unit 50 includes a light source module 300 emitting a light, a light source cover 400 that covers the light source module 300, a light guide plate 200 that receives the light from the light source module 300 and including a light exiting surface 221 from which the light exits, and a fixing member 600 that surrounds a light facing portion 230 of the light guide plate 200 and that holds the position of the light guide plate 200.

The light source cover 400 includes an upper cover 410, a center cover 420, and a fixing portion 440. The upper cover 410 is disposed on the light source module 300 to cover the light source module 300 in a plan view and support the light facing portion 230 of an adjacent light emitting unit 50. The light facing portion 230 is disposed in an inclined manner, so that an upper surface 411 of the upper cover 410 may be inclined to have a steep slope equal to that of the light facing portion 230. In addition, the upper cover 410 includes a light incident facing surface 413 corresponding to the light incident portion 210 to cover the light incident portion 210 of the light guide plate 200. In this case, the light incident facing surface 413 may have a steep slope equal to that of the light incident portion 210 and guides the light passing through the light incident portion 210 to the light guiding portion 220. The upper cover 410 includes a device-facing surface 415 corresponding to an upper surface of the light emitting device 310. The device-facing surface 415 faces the light emitting device 310 of the light source module 300 and guides the light from the light emitting device 310 to the light incident portion 210.

The upper cover 410 of the light source cover 400 is connected with the center cover 420. The center cover 420 extends vertically downwardly from the upper cover 410 and is positioned at a rear of the light emitting surface of the light emitting device 310. In FIG. 3A, the center cover 420 has a flat shape, but it should not be limited thereto. That is, the center cover 420 may have various shapes if the center cover 420 may connect the upper cover 410 and the fixing portion 440 to cover the light emitting device 310. The fixing portion 440 extends from the center cover 420 and fixes the light source cover 400 to the lower container 100. According to FIG. 3A, the fixing portion 440 extends toward an opposite direction, i.e., to the adjacent light emitting unit 50, of a corresponding light source module 300, so that the thickness of the backlight assembly 10 may be reduced by arranging the lower cover 430 under the light source module 300 as shown in FIG. 2. In other words, the fixing portion 440 is placed at a vacant space under the light guiding portion 220 of the light guide plate 200 of the adjacent light emitting unit 50, to thereby reduce the thickness of the backlight assembly 10.

Figure 3B:
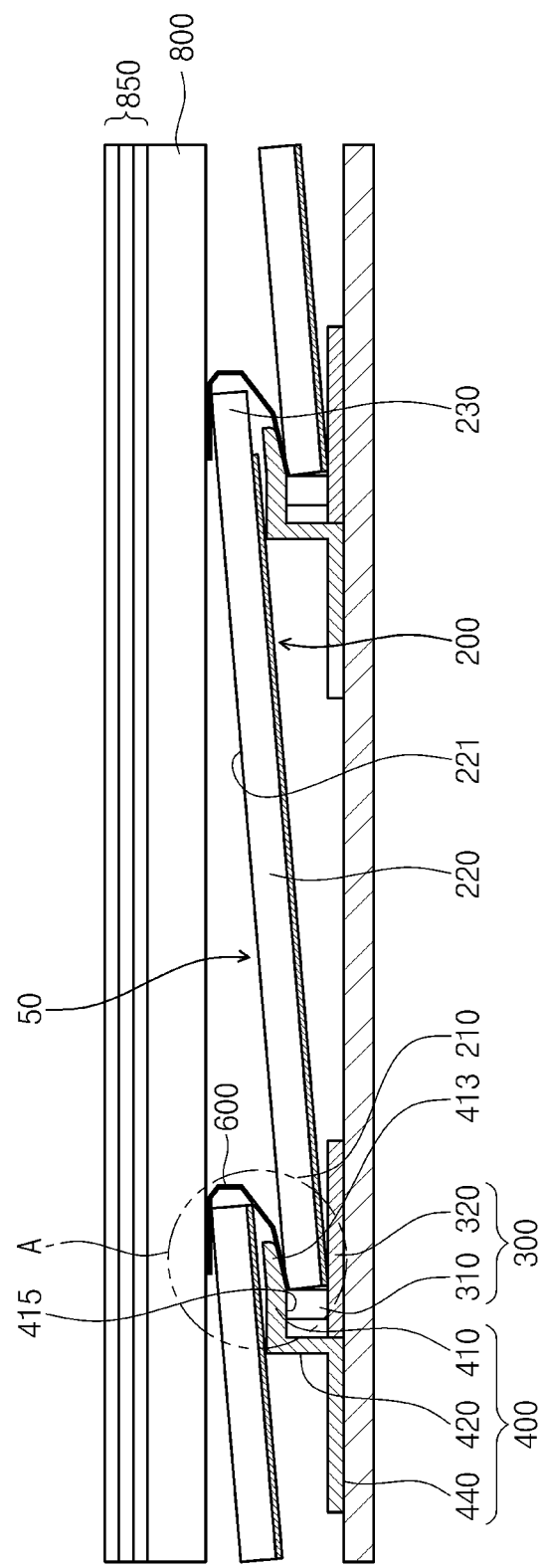
FIG. 3B is a sectional view showing a structure of the backlight assembly wherein the fixing member of FIG. 3A is pressed and fixed by a light diffusion plate.

Meanwhile, in case that the light facing portion 230 of the light emitting unit 50 is mounted on the light source cover 400 of the adjacent light emitting unit 50, the light facing portion 230 may be vulnerable to external impact since the light facing portion 230 is not fixed. Thus, the light facing portion 230 is mechanically coupled with the light source cover 400, thereby improving impact resistance of the light facing portion 230. Such structure to improve the impact resistance is shown in FIGS. 3A and 3B. According to FIGS. 3A and 3B, the fixing member 600 having a flexible sheet shape is provided to the backlight assembly 10. The fixing member 600 connects the light facing portion 230 of the light guide plate 200 of the corresponding light emitting unit 50 and the light source cover 400 of the adjacent light emitting unit 50.

Figure 3C:
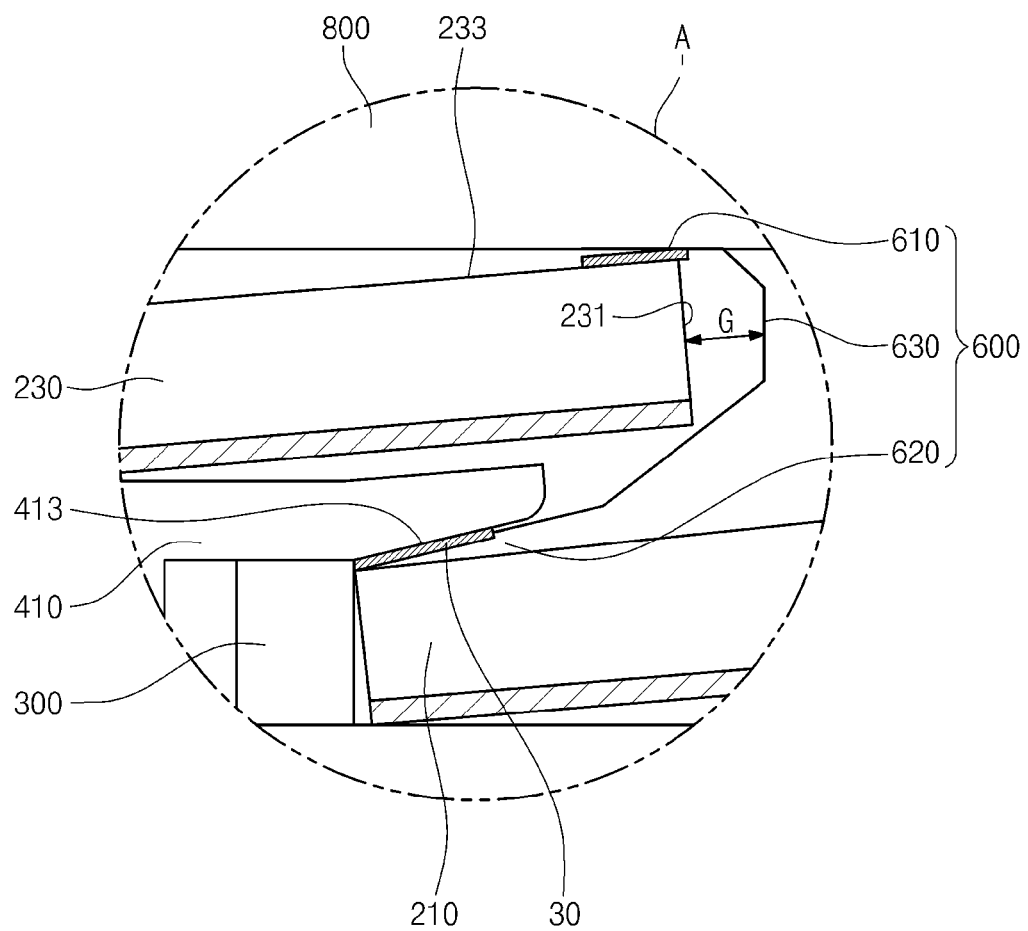
FIG. 3C is an enlarged view showing portion "A" of FIG. 3B to illustrate a connection between a light guide plate and a light source cover according to the fixing member.

FIG. 3B is a sectional view showing a structure of the backlight assembly wherein the fixing member of FIG. 3A is pressed and fixed by a light diffusion plate, and FIG. 3C is an enlarged view showing portion "A" of FIG. 3B to illustrate a connection between a light guide plate and a light source cover according to the fixing member.

Referring to FIGS. 3B and 3C, the fixing member 600 connects the light source cover 400 of the corresponding light emitting unit 50 and the light facing portion 230 of the light guide plate 200 of the light emitting unit 50 adjacent to the corresponding light emitting unit 50. In particular, the fixing member 600 includes a first fixing portion 610 coupled with an upper surface 233 of the light facing portion 230 of the light guide plate 200 of the adjacent light emitting unit 50, a second fixing portion 620 coupled with the upper cover 410 of the light source cover 400 covering the light source module 300, and a connection portion 630 connecting the first fixing portion 610 and the second fixing portion 620. In the present exemplary embodiment, the upper cover 410 includes the light incident facing surface 413 facing the light incident portion 210 of the light guide plate 200, and the second fixing portion 620 is connected with the light incident facing surface 413. The first and second fixing portions 610 and 620 may be coupled with the upper surface 233 of the light facing portion 230 and the light incident facing surface 413 with an adhesive member 30 such as a double-sided adhesive tape.

Meanwhile, the connection portion 630 may be spaced apart from the light facing surface 231 of the light facing portion 230 by a predetermined distance G. In general, the light emitting device 310 in the backlight assembly 10 converts the electrical energy to the light energy, and the remaining part of the electrical energy not converted to the light energy is converted to the thermal energy. Thus, a portion of the light guide plate 200 adjacent to the light emitting device 310 may be expanded by the thermal energy. This thermal expansion may occur adjacent to the light emitting device 310 that serves as a thermal source. In case of the backlight assembly 10 according to the present exemplary embodiment, since the thermal expansion may occur in a region adjacent to the light incident portion 210 of the corresponding light emitting unit 50 and the light facing portion 230 of the adjacent light emitting unit 50, the length of the light guide plate 200 may be lengthened. However, when the connection portion 630 of the fixing member 600 is located at a position spaced apart from the light facing surface 231 with the distance G as shown in FIG. 3C, the fixing member 600 holds the light guide plate 200 even if the light guide plate 200 is expanded.

As described above, the fixing member 600 connects the light source cover 400 of the corresponding light emitting unit 50 and the light facing portion 230 of the light guide plate of the adjacent light emitting unit 50 to prevent the movement of the light facing portion 230 of the light guide plate 200. In other words, the light facing portion 230 of the corresponding light emitting unit 50 is coupled with the light source cover 400 of the adjacent light emitting unit 50, and thus the light guide plate 200 may have the impact resistance with respect to external impact applied by manufacturer or user. In the present exemplary embodiment, the first fixing portion 610 may be pressed and fixed to the light facing portion 230 of the light guide plate 200 of the adjacent light emitting unit 50 by the diffusion plate 800 provided above the light guide plate 200. The diffusion plate 800 may have a thickness greater than the light guide plate 200 and apply a load to the fixing member 600 to prevent the movement of the fixing member 600.

In FIGS. 3A to 3C, a structure wherein the diffusion plate 800 presses the fixing member 600 by the force of gravity is been shown, but, in the backlight assembly 10 according to the present exemplary embodiment, movement of the light facing portion 230 of the light guide plate 200 may also be prevented if only the light facing portion 230 is coupled with the light source cover 400 that overlaps the light facing portion 230 by the fixing member 600. Accordingly, the light facing portion 230 of the light guide plate may be spaced apart from the diffusion plate 800 with a predetermined distance.

In consideration of optical characteristic of the backlight assembly, the fixing member 600 may reflect the light while fixing the light facing portion 230 of the light guide plate 200. The fixing member 600 for the reflection of the light may be a reflection sheet that is formed of polyethyleneterephthalate (PET) coated with a white color. On the contrary, the fixing member 600 may be a transparent film in order to minimize negative affects on the optical design of the backlight assembly, which are caused by the fixing member 600. In case that the fixing member 600 is the transparent film, the negative affects caused by the fixing member 600 on the light distribution in the light facing portion 230 may be reduced, thereby reducing optical negative affects even though the connection portion 630 of the fixing member 600 covers a portion of the light guiding portion 220 of the light guide plate 200.

Figure 4A:
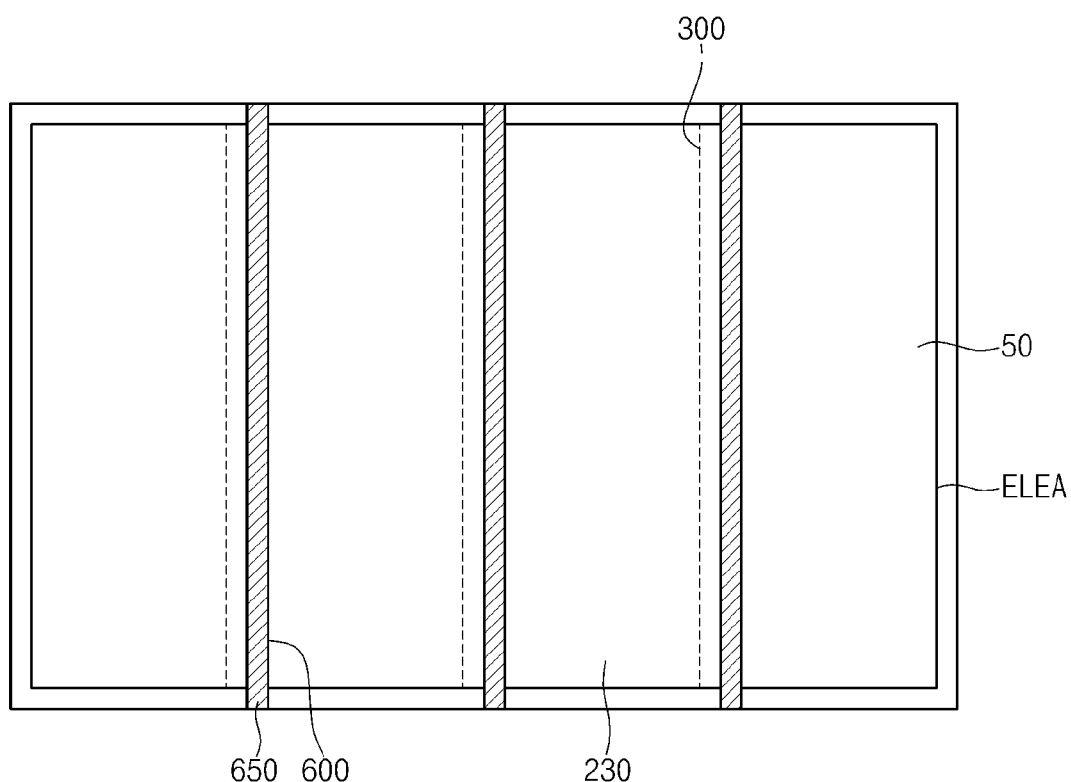
FIG. 4A, FIG. 4B, and FIG. 4C are plan views showing the backlight assembly including the light guide plate that is fixed by the fixing member according to exemplary embodiments of the present invention.
Figure 4B:
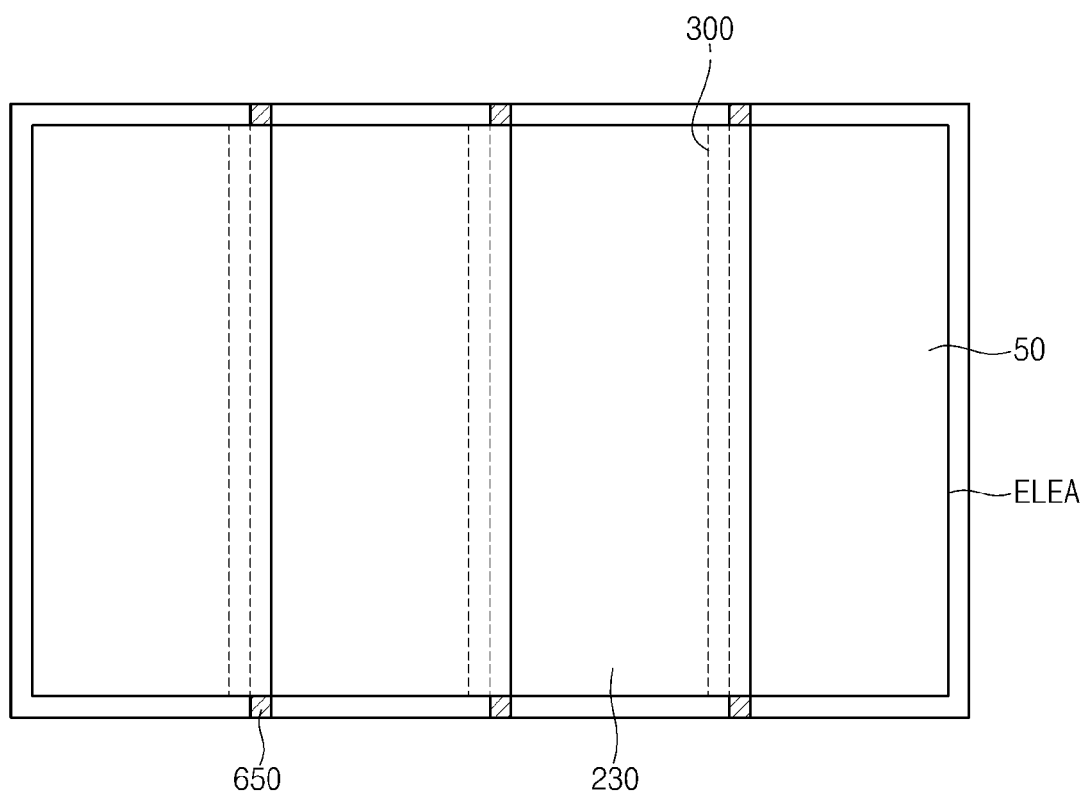
Figure 4C:
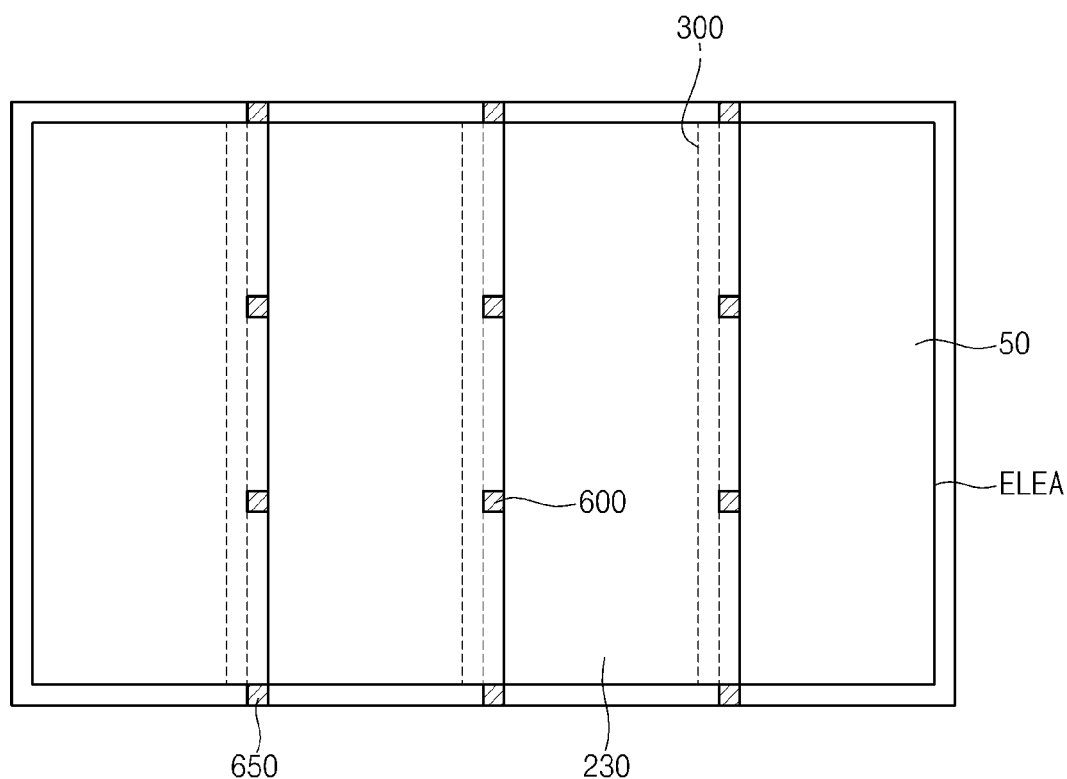

FIGS. 4A to 4C are plan views showing the backlight assembly including the light guide plate that is fixed by the fixing member according to an exemplary embodiment of the present invention. For the convenience of explanation, the diffusion plate 800 and the optical sheet 850 disposed on the light guide plate as shown in FIGS. 1 to 3 have been omitted in the backlight assembly of FIGS. 4A to 4C.

Referring to FIG. 4A, the backlight assembly includes four light emitting units 50. Each light emitting unit 50 includes the light source module 300, and the light source module 300 of each light emitting unit 50 is covered by the light facing portion 230 of the adjacent light emitting unit 50 except for a right-side outermost light emitting unit 50 on the right side. The light source module 30 of the right-side outermost light emitting unit 50 is covered by an effective light emitting area ELEA of the backlight assembly. In FIG. 4A, each light facing portion 230 is covered by the fixing member 600 and extended from a first side of the effective light emitting area ELEA to a second side of the light effective light emitting area ELEA, which is opposite to the first side. Particularly, the fixing member 600 may be extended outside the effective light emitting area ELEA by using an outer fixing portion 650. The outer fixing portion 650 may fix the light facing portion 230 of the light guide plate 200 of each light emitting unit 50 without negatively affecting the light distribution of the backlight assembly 10.

FIG. 4B shows a backlight assembly employing only the outer fixing portion 650 as the fixing member.

According to FIG. 4B, the fixing member is placed outside the effective light emitting area ELEA, thereby minimizing the negative affects caused by the fixing member on the light distribution of the backlight assembly 10.

FIG. 4C shows a backlight assembly 10 employing the fixing member placed at portions in the effective light emitting area ELEA and outside the effective light emitting area ELEA.

Referring to FIG. 4C, since the fixing member 600 is discontinuously formed in the effective light emitting area ELEA, the negative affects on the light distribution may be reduced. In addition, the fixing member 600 may effectively fix the light facing portion 230 of each light emitting unit 50 together with the outer fixing portion 650.

The arrangement and distribution of the fixing member shown in FIGS. 4A to 4C may be applied to the backlight assembly shown in FIGS. 3A to 3C, but this may be applied to backlight assemblies that will be described later.

Figure 5A:
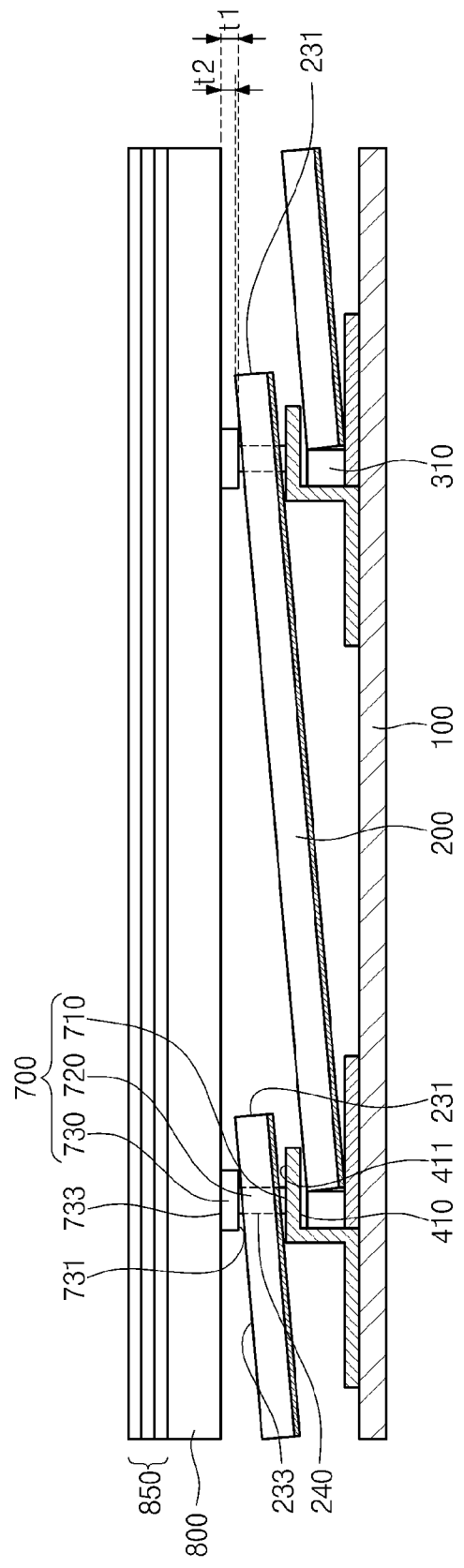
FIG. 5A is a sectional view showing a structure of the backlight assembly wherein a protruded fixing portion formed on the light source cover fixes an adjacent light facing portion.

FIG. 5A is a sectional view showing a structure of the backlight assembly wherein a protruded fixing portion formed on the light source cover 400 fixes an adjacent light facing portion.

Referring to FIG. 5A, the upper cover 410 of the light source cover 400 is provided with a protruding fixing member 700 formed thereon. A lower portion 710 of the protruding fixing member 700 is attached to the upper surface 411 of the upper cover 410. A body portion 720 extends from the lower portion 710 of protruding fixing part 700 and a lid 730 is formed at the end of the body portion 720. In detail, the body portion 720 passes through a fixing hole 240 formed through the light guide plate 200 and the lid 730 makes contact with the upper surface 233 of the light facing portion 230 to prevent the light guide plate 200 from being separated from the protruding fixing member 700. To this end, the lid 730 has a cross-sectional area wider than that of the body portion 720. The upper surface 233 of the light facing portion contacts a first surface 731 of the lid 730. A second surface 733 opposite to the first surface 731 of the lid 730 contacts the diffusion plate 800. That is, the first surface 731 of the lid 730 faces the light guide plate 200 and the second surface 733 faces the liquid crystal panel.

In FIG. 5A, a structure wherein the light guide plate 200 is provided with the fixing hole 240 to accommodate the body portion 720 is shown, but the structure of the light guide plate 200 to accommodate the body portion 720 should not be limited to the fixing hole 240. That is, in case that the protruding fixing member 700 does not have a lid 730, a fixing recess that does not penetrate the light guide plate 200 may be formed in the light guide plate 200 instead of forming the fixing hole 240. In exemplary embodiments that will be described below, the fixing recess may be formed instead of the fixing hole in the structure that the lid 730 is not included in the protruding fixing member 700.

The lid 730 of the protruding fixing member 700 has a predetermined thickness t1. Due to the thickness t1, the light facing portion 230 of the light guide plate does contact the diffusion plate 800. That is, the light facing portion 230 is spaced apart from the diffusion plate 800 by a predetermined distance t2. Thus, although the light guide plate 200 is expanded in its longitudinal direction due to the light emitted from the light emitting device 310, the light facing surface 231 of the light facing portion 230 does not contact the diffusion plate 800. Since the diffusion plate 800 is supported by the lid 730 of the protruding fixing member 700, the light guide plate 200 may be prevented from moving without the support by the light facing portion 230 of the light guide plate 200.

The protruding fixing member 700 may be formed of a plastic material, and the light source cover 400 to which the protruding fixing member 700 is coupled may be formed of a plastic or metal material. In the case that the light source cover 400 is formed of the metal material, the heat generated from the light emitting device 310 may be effectively dissipated through the lower container 100. In the present exemplary embodiment, the protruding fixing member 700 is coupled with the light source cover 400 through a manufacturing process such as an insert injection molding method. In the insert injection molding method, the upper cover 410 of the light source cover 400 may be positioned at the substantially same level as the lower portion 710 of the protruding fixing member 700. In the case that the light source cover 400 is formed of the plastic material, the protruding fixing member 700 may be integrally formed with the light source cover 400, so that the lower portion 710 of the protruding fixing member 700 may be the same member as the upper cover 410 of the light source cover 400.

Figure 5B:
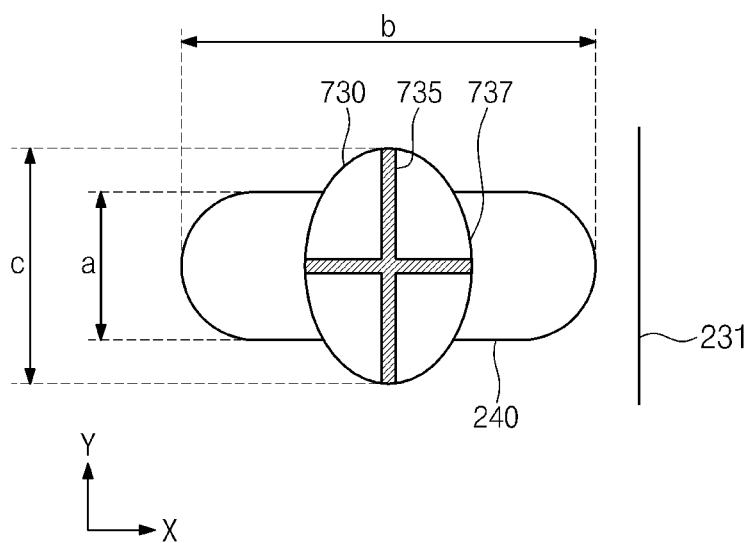
FIG. 5B is a plan view showing a structure wherein the protruded fixing portion of FIG. 5A fixes the light guide plate.

FIG. 5B is a plan view showing a structure wherein the protruded fixing member 700 of FIG. 5A fixes the light guide plate 200. For the convenience of explanation, the diffusion plate and the optical sheet of the backlight assembly will be omitted.

Referring to FIG. 5B, the lid 730 of the protruding fixing member 700 has a straight recess 735. One or a plurality of the straight recess 735 may be provided in the lid. When the outer surface 737 of the lid 730 is pressed toward a center of the lid 730, the outer surface 737 moves to the center of the lid 730. Then, the outer surface 737 returns its original position when the pressing force applied to the outer surface 737 is removed. The width of the lid 730 becomes smaller than the width of the fixing hole 240 formed through the light guide plate while pressing the outer surface 737, so that the lid 730 may pass through the fixing hole 240. After that, the pressing force is removed and the lid 730 is positioned on the upper surface of the light facing surface 231 corresponding to the fixing hole 240

Meanwhile, the fixing hole 240 formed through the light guide plate 200 has an oval shape having a longer axis corresponding to a longitudinal direction (x) of the light guide plate 200 when viewed in a plan view. Although the fixing member 240 may have various shapes, the axis of the fixing hole 240 corresponding to the longitudinal direction (x) is longer than an axis of the fixing hole 240 corresponding to a direction (y) substantially perpendicular to the longitudinal direction (x). That is, the fixing hole 240 has a length (b) corresponding to the longitudinal direction (x) greater than the width (c) of the lid 730. However, a length (a) of the fixing hole 240 corresponding to the direction (y) perpendicular to the longitudinal direction (x) is shorter than the width (c) of the lid 730. Thus, the lid 730 may hold the light guide plate 200, so that the light guide plate 200 may maintain its position even if the light guide plate 200 expands due to temperature.

Figure 6A:
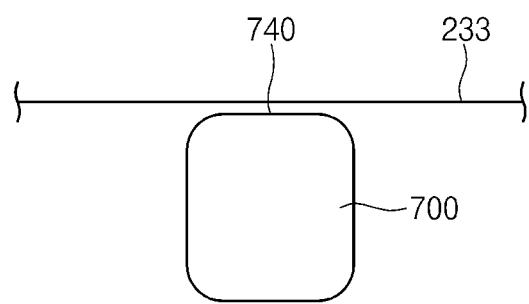
FIG. 6A, FIG. 6B, and FIG. 6C are sectional views showing various protruded fixing members according to exemplary embodiments of the present invention.
Figure 6B:
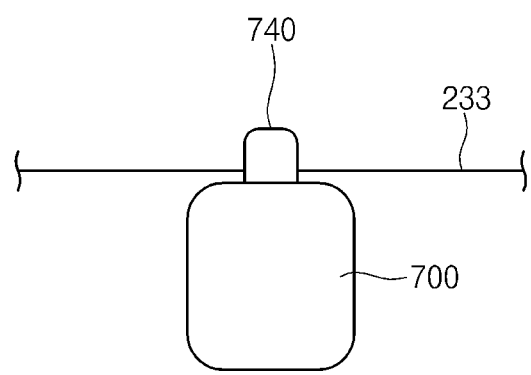
Figure 6C:
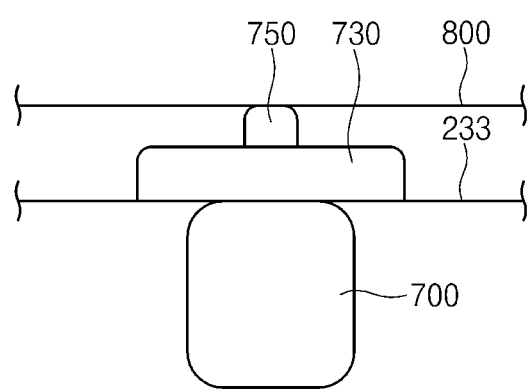

FIGS. 6A to 6C are sectional views showing various protruded fixing members according to an exemplary embodiment of the present invention.

Referring to FIG. 6A, the protruding fixing member 700 has a shape obtained by removing the lid 730 of the protruding fixing member 700. An uppermost surface 740 of the protruding fixing member 700 is flat and provided at a lower position than the upper surface 233 of the light facing portion 230 of the light guide plate 200. If the protruding fixing member 700 is transparent, the concentration of the light in the protruding fixing member 700 becomes weak, and if the protruding fixing member 700 is opaque, dark-area phenomenon caused by the protruding fixing member 700 may be prevented.

In the protruding fixing member 700 shown in FIG. 6B, an uppermost surface 740 of the protruding fixing member 700 is provided at a position higher than the upper surface 233 of the light facing portion 230 of the light guide plate 200. The uppermost surface 740 may contact the diffusion plate 800 and support the diffusion plate 800 together with the body portion 720 of the protruding fixing member 700. In addition, since the uppermost surface 740 has a cross-sectional area smaller than that of the body portion 720 in a plan view, the light concentration in the protruding fixing member 700 may be prevented from appearing through the diffusion plate 800. If the protruding fixing member 700 is opaque, the dark-area phenomenon appearing on the diffusion plate may be prevented.

Referring to FIG. 6C, a protrusion 750 is formed on the lid 730 of the protruding fixing member 700 shown in FIGS. 5A and 5B. As shown in FIG. 6B, the protrusion 750 may support the diffusion plate 800 and have a relatively smaller cross-sectional area, so that the protruding fixing member 700 may be prevented from being recognized outside the backlight assembly 10.

The protruding fixing members 700 shown in FIGS. 5A to 5C and 6A to 6C may be distributed the same as the fixing member 600 shown in FIGS. 4B and 4C. Specifically, in case that the outer fixing portion 650 is formed in the backlight assembly 10, display quality of the backlight assembly may be easily improved since the light facing portion 230 of the light guide plate 200 of each light emitting unit 50 is fixed by the fixing member provided outside the effective light emitting area ELEA. However, although the fixing member 600 is formed in the effective light emitting area ELEA, inconsistency in brightness caused by sag of the diffusion plate 800 may be prevented since the protruding fixing member 700 supports the diffusion plate 800.

FIG. 7 is a sectional view showing a structure of the backlight assembly wherein a light guiding portion of the light guide plate is supported and fixed by a light guide plate supporting portion formed on a lower container and an engaging member.

Referring to FIG. 7, a light guide plate supporting member 150 is disposed in a lower space 280 between the lower container 100 and the light guide plate 200. The light guide plate supporting member 150 is fixed to the main surface 110 of the lower container 100 to support the reflecting sheet 500 that contacts the reflecting surface of the light guide plate 200 and to support the light guiding portion 220 of the light guide plate 200. The light guide plate supporting member 150 is coupled with a coupling member 290 to hold the light guide plate 200. The light guide plate 200 is provided with a through hole 227 formed therethrough, and the coupling member 290 passes through the through hole 227 and is coupled with the light guide plate supporting member 150. In this case, the through hole 227 is positioned in the effective light emitting area ELEA or at the outer fixing portion outside the effective light emitting area ELEA. The through hole 227 may have a length longer than a width of a lid 291 in a longitudinal direction of the light guide plate 200 as shown in FIG. 5B.

The light guide plate supporting member 150 may be provided as a separate member from the lower container 100, or the light guide plate supporting member 150 may be formed by deforming a portion of the lower container 100 such that the light guide plate supporting member 150 is integrally formed with the loser container 100. For instance, although not shown in figures, a portion of the main surface 110 of the lower container 100 is cut and bent to form the light guide plate supporting member 150. In addition, one or a plurality of the light guide plate supporting member 150 may be provided in the lower space 280. Further, since the light guide plate supporting member 150 fixes the reflecting sheet 500 to the light guide plate 200, the brightness uniformity of the light emitting unit 50 may be improved.

Figure 8:
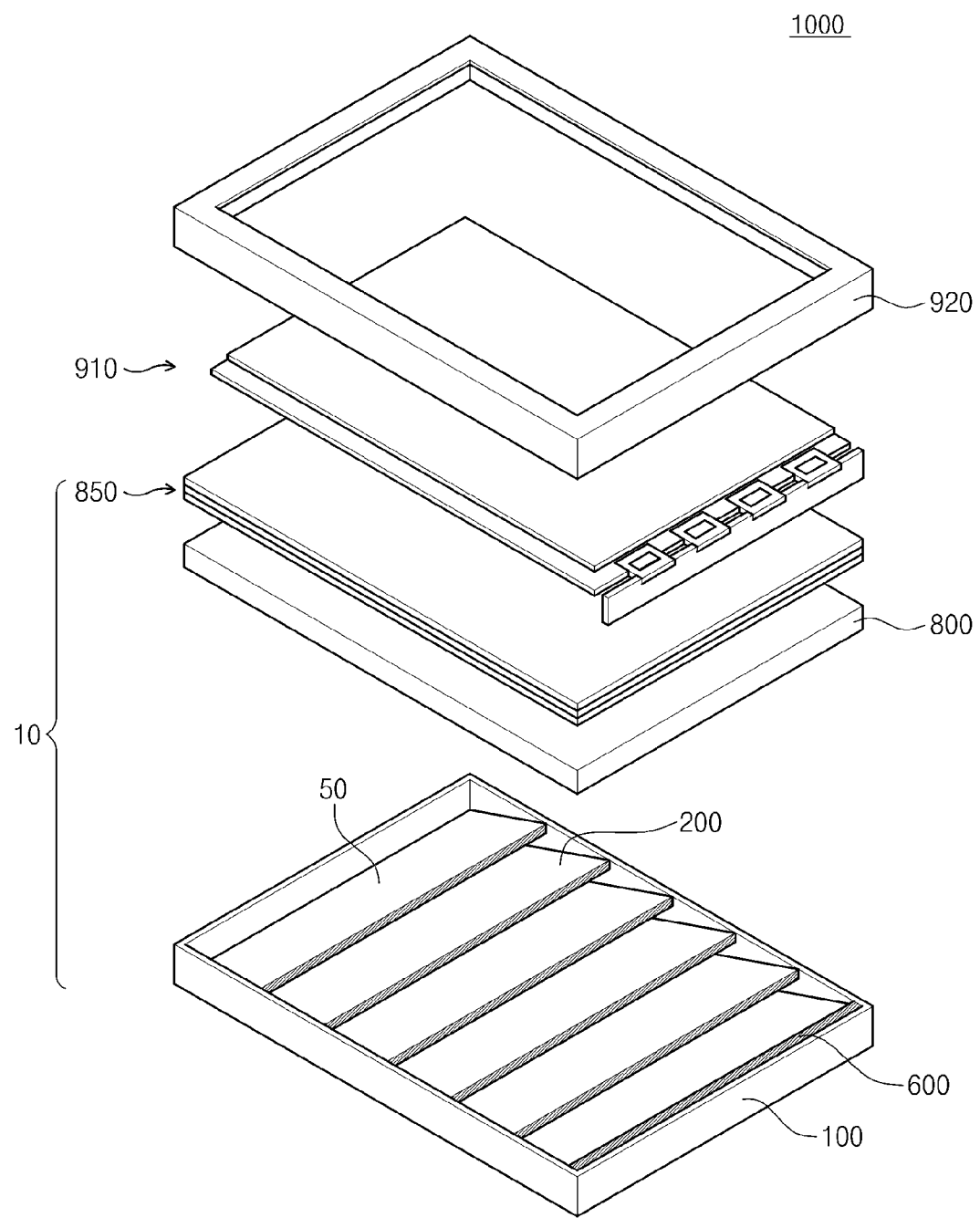
FIG. 8 is an exploded perspective view showing a liquid crystal display to which a light guide plate fixing structure is applied according to exemplary embodiments of the present invention.

FIG. 8 is an exploded perspective view showing a liquid crystal display to which a light guide plate fixing structure is applied according to an exemplary embodiment of the present invention.

Referring to FIG. 8, a backlight assembly 10 of a liquid crystal display 1000 employs the fixing member 600 shown in FIGS. 3A and 3B. The fixing member 600 is arranged in the same manner as the fixing member shown in FIG. 4A. However, all the above-described backlight assemblies may be applied to the liquid crystal display 1000. In other words, the light source cover of each light emitting unit may be mechanically coupled with the light facing portion of the adjacent light emitting unit, and the mechanical coupling of the light source cover and the light facing portion may be achieved by the fixing member or the protruding fixing member. In addition, the light guide plate may be supported and fixed by the light guide plate supporting member disposed in the lower space.

The member to support and fix the light guide plate may be positioned outside the effective light emitting area of the backlight assembly. In addition, the member to support and fix the light guide plate may be positioned inside the effective light emitting area of the backlight assembly. The position and number of the members may be varied if the brightness uniformity of the backlight assembly is obtained and the movement of the light guide plate is prevented. In the exemplary embodiments, the effective light emitting area of the backlight assembly corresponds to a display area, on which images are displayed, of a liquid crystal panel 910.

The liquid crystal display 1000 according to FIG. 8 includes the backlight assembly 10, the liquid crystal panel 910 disposed on the backlight assembly 10 that selectively transmits the light to display the images, and an upper container 920 that fixes the liquid crystal panel 910 and the backlight assembly 10 to the lower container 100.

The liquid crystal display according to the present invention employs the hybrid-type backlight assembly, so that the liquid crystal display may be provided in a light weight configuration and may perform local dimming. As a result, the display quality of the liquid crystal display may be improved and the power consumption of the liquid crystal display may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
 a plurality of light emitting units arranged adjacent to each other to provide a light to a display panel; and
 a lower container that accommodates the light emitting units,
 wherein at least one light emitting unit of the plurality of light emitting units comprises a light source module to emit the light, a light guide plate to guide the light emitted from the light source module to the display panel, a light source cover covering the light source module, and a fixing member surrounding a light facing portion of a light guide plate of an adjacent light emitting unit so as to fix the light guide plate of the adjacent light emitting unit.

2. The backlight assembly of claim 1, wherein the light guide plate comprises:
 a light incident portion to which the light from the light source module is incident;
 a light guiding portion in which the light that enters through the light incident portion is reflected and scattered such that the light exits the light guide plate; and
 a light facing portion opposite to the light incident portion,
 wherein the fixing member is coupled with a light facing portion of the light guide plate of the adjacent light emitting unit.

3. The backlight assembly of claim 2, wherein the light source cover comprises an upper cover to support the light facing portion of the light guide plate of the adjacent light emitting unit.

4. The backlight assembly of claim 3, wherein the upper cover comprises a light incident facing surface corresponding to the light incident portion, and
 the fixing member comprises:
 a first fixing portion coupled with an upper surface of the light facing portion of the adjacent light emitting unit;
 a second fixing portion coupled with the light incident facing surface; and
 a connection portion that connects the first fixing portion and the second fixing portion.

5. The backlight assembly of claim 4, wherein the light facing portion comprises a light facing surface facing the light incident portion and the connection portion is spaced apart from the light facing surface.

6. The backlight assembly of claim 4, wherein the fixing member comprises a reflective material and has a sheet shape.

7. The backlight assembly of claim 4, wherein the fixing member comprises a transparent material and has a sheet shape.

8. The backlight assembly of claim 2, wherein the light facing portion of the light guide plate comprises a fixing recess.

9. The backlight assembly of claim 8, wherein the light source cover comprises an upper cover to support the light facing portion of the adjacent light emitting unit, and the fixing member is fixed to the upper cover of the light source cover.

10. The backlight assembly of claim 9, wherein the fixing member protrudes from the upper cover to be disposed in the fixing recess of the light facing portion of the adjacent light emitting unit.

11. The backlight assembly of claim 9, wherein the fixing member comprises a body portion disposed in the fixing recess of the light facing portion of the adjacent light emitting unit.

12. The backlight assembly of claim 11, wherein the fixing recess comprises a fixing hole formed through the light facing portion, the fixing member comprises a lid extended from the body portion, and the lid is disposed on the upper surface of the light facing portion of the adjacent light emitting unit.

13. The backlight assembly of claim 12, wherein the fixing hole has a long axis extended in a direction along the light guide plate, and a width of the lid of the fixing member is shorter than the long axis of the fixing hole.

14. The backlight assembly of claim 11, wherein an uppermost surface of the body portion of the fixing member is disposed at a position lower than the upper surface of the light facing portion.

15. The backlight assembly of claim 11, wherein an uppermost surface of the body portion of the fixing member is disposed at a higher position than the upper surface of the light facing portion.

16. The backlight assembly of claim 15, wherein a horizontal cross-sectional area of an uppermost portion of the body portion is smaller than a horizontal cross-sectional area of the fixing recess of the light facing portion.

17. The backlight assembly of claim 11, wherein the fixing recess comprises a fixing hole formed through the light facing portion, the fixing member comprises a lid extending from the body portion and a second protrusion portion extending from the lid, and the lid is disposed on the upper surface of the light facing portion.

18. The backlight assembly of claim 17, further comprising a diffusion plate, wherein the second protrusion portion has a horizontal cross-sectional area that is smaller than a horizontal cross-sectional area of the fixing recess.

19. The backlight assembly of claim 1, wherein the backlight assembly comprises an effective light emitting area and the fixing member is disposed outside the effective light emitting area.

20. The backlight assembly of claim 19, wherein the fixing member is further disposed inside the effective light emitting area.

\* \* \* \* \*